United States Patent
Lin (10) Patent No.: US 12,005,562 B2
(45) Date of Patent: Jun. 11, 2024

(54) TELESCOPIC TUBE ASSEMBLY

(71) Applicant: WISE CENTER PRECISION APPLIANCE CO., LTD., Taichung (TW)

(72) Inventor: Thomas Lin, Taichung (TW)

(73) Assignee: WISE CENTER PRECISION APPLIANCE CO., LTD., Taichung (TW)

( * ) Notice: Subject to any disclaimer, the term of this patent is extended or adjusted under 35 U.S.C. 154(b) by 410 days.

(21) Appl. No.: 17/462,551

(22) Filed: Aug. 31, 2021

(65) Prior Publication Data

US 2023/0063067 A1 Mar. 2, 2023

(51) Int. Cl.
*B25G 1/04* (2006.01)
*F16B 7/10* (2006.01)

(52) U.S. Cl.
CPC ............... *B25G 1/04* (2013.01); *F16B 7/105* (2013.01)

(58) Field of Classification Search
CPC ........ F16B 7/04; F16B 7/0406; F16B 7/0426; F16B 7/10; F16B 7/105; F16B 7/14; F16B 7/1418; F16B 7/1454; F16B 7/1472; B25G 1/04
See application file for complete search history.

(56) References Cited

U.S. PATENT DOCUMENTS

| | | | | |
|---|---|---|---|---|
| 4,029,279 A | * | 6/1977 | Nakatani | F16B 7/1454 403/109.5 |
| 5,775,352 A | * | 7/1998 | Obitts | A45B 9/00 135/65 |
| 5,975,592 A | * | 11/1999 | Lin | E05C 1/06 292/159 |
| 6,536,723 B1 | * | 3/2003 | Nakatani | F16M 11/36 248/163.1 |
| 7,293,934 B1 | * | 11/2007 | Huang | F16B 7/105 403/379.5 |
| 8,683,657 B2 | * | 4/2014 | Lin | B25G 1/04 16/429 |
| 9,205,549 B1 | * | 12/2015 | Lin | B25G 1/04 |
| 11,603,876 B2 | * | 3/2023 | Chou | F16B 7/105 |
| 2005/0126612 A1 | * | 6/2005 | Chen | A45B 9/00 135/16 |
| 2016/0258489 A1 | * | 9/2016 | Yao | F16D 1/108 |

FOREIGN PATENT DOCUMENTS

DE 9110489 U1 * 11/1991

* cited by examiner

Primary Examiner — Jonathan P Masinick
(74) Attorney, Agent, or Firm — MUNCY, GEISSLER, OLDS & LOWE, PC (57) ABSTRACT

A telescopic tube assembly includes a first tube and a second tube penetrated in the first tube. A handle is pivoted to a base sleeved on the first tube and pressed against the second tube when the handle is locked. Further, a pin is provided between the base and a cover mounted to the base, and a button is horizontally disposed in the base. When the button is pressed, the pin is pushed by the button to be disengaged from the second tube, such that the length of the second tube can be adjusted. When the button is released, the pin is pushed by an elastic member to be engaged with the second tube for locking the second tube in a desired length. By means of the dual lock design, the telescopic tube assembly of the present invention provides good positioning effect to reduce operational risk.

4 Claims, 9 Drawing Sheets

TELESCOPIC TUBE ASSEMBLY

BACKGROUND OF THE INVENTION

1. Field of the Invention

The present invention relates to a telescopic tube assembly and more particularly, to a telescopic tube assembly that provides a good positioning effect.

2. Description of the Related Art

Gardening tools (such as tree branch shears, loppers or pruning saws) used to cut branches and leaves or fruits of higher position provides a set of cutting blades at the front end of a telescopic grip. A positioning mechanism is used to control and adjust the telescopic length of the grip to facilitate the cutting of branches and leaves or fruits of different height.

The conventional positioning mechanism mainly uses a cam handle to tightly fix an inner tube and an outer tube together. However, the aforesaid cam handle may easily become loose by an external force. In addition to the danger in use, the extension distance of the telescopic grip will be restricted due to lack of pressing force. As such, it is difficult to meet the needs of the market.

SUMMARY OF THE INVENTION

It is a primary objective of the present invention to provide a telescopic tube assembly, which provides a good positioning effect to meet the needs of long-distance use.

To attain the above objective, the telescopic tube assembly of the present invention comprises a first tube, a second tube, a first positioning unit, and a second positioning unit. The first tube has a first positioning hole. The second tube is movably disposed in the first tube and has a plurality of second positioning holes arranged in a spaced manner along the axial direction of the second tube. The first positioning unit includes a base and a handle. The base is mounted to the first tube and has a first positioning portion and a through hole. The handle has a handle portion and a cam portion connected with the handle portion and pivoted to the base, such that the handle is pivotable relative to the base between a lock position where the cam portion of the handle pushes the first positioning portion of the base for enabling the first positioning portion of the base to be pressed against the outer surface of the first tube, and an unlock position where the cam portion of the handle leaves the first positioning portion of the base for enabling the first positioning portion of the base to be loosen from the outer surface of the first tube. The second positioning unit includes a cover, a pin, an elastic member, and a button. The cover is disposed on the base to define an accommodation space located between the cover and the base and communicating with the through hole. The pin is axially movably disposed in the accommodation space and has a second positioning portion passing through the through hole of the base and the first positioning hole of the first tube. The elastic member is disposed between the cover and the pin for providing an elastic force to push the pin in a direction away from the cover. The button is horizontally movably disposed in the base so as to be moveable between a press position where the pin is pushed by the button towards the cover for enabling the second positioning portion of the pin to be unlocked from the second positioning holes of the second tube, thereby adjusting the length of the second tube, and a releasing position where the pin is pushed by the elastic member away from the cover for enabling the second positioning portion of the pin to be locked to one of the second positioning holes of the second tube, thereby completing the length adjustment of the second tube.

It can be understood from the above illustration that if a user would like to adjust the length of the second tube, the user unlocks the handle first, and then presses the button to release the pin from the second tube. At this time, the length of the second tube can be adjusted. After the second tube reaches a desired length, the user releases the pressing force applied to the button to enable the pin to be locked to the second tube under the elastic force of the elastic member, and finally locks the handle to enable the base to be tightly pressed against the second tube. As such, with the dual pressing mechanism, the telescopic tube assembly of the present invention has a good positioning effect to reduce the risk of operation, and does not easily become loose by an external force, so it can meet the needs of long-distance use.

Preferably, the pin further has a first outer flange and a second outer flange abutted with the first outer flange. The button has an inclined plane. The elastic member is disposed between the cover and the first outer flange of the pin. By this way, when the button is located at the press position, the second outer flange of the pin is pushed by the inclined plane of the button, such that the pin is moved towards the cover. When the button is located at the releasing position, the first outer flange of the pin is pushed by the elastic member, such that the pin is moved away from the cover.

Preferably, the button further has an elongated slot for insertion of the pin and an inner flange connected with a periphery wall of the elongated slot and provided with the inclined plane. The second outer flange of the pin is engaged with the inner flange of the button, such that the second outer flange of the pin is pushed by the inclined plane of the button when the button is pressed by an external force.

Preferably, the handle further has a block portion connected with the handle portion. When handle is located at the lock position, the block portion of the handle is engaged with the elongated slot of the button, such the button is kept in the releasing position. When the handle is located at the unlock position, the block portion of the handle is disengaged from the elongated slot of the button, such that the button can be moved from the releasing position to the press position.

Preferably, the base further has a hollow slot abutted with the first positioning portion. When the first positioning portion of the base is pushed by the cam portion of the handle pushes, the first positioning portion of the base is deformed elastically by means of the hollow slot to be pressed against the outer surface of the second tube.

Other advantages and features of the present invention will be fully understood by reference to the following specification in conjunction with the accompanying drawings, in which like reference signs denote like components of structure.

DETAILED DESCRIPTION OF THE INVENTION

Figure 1:
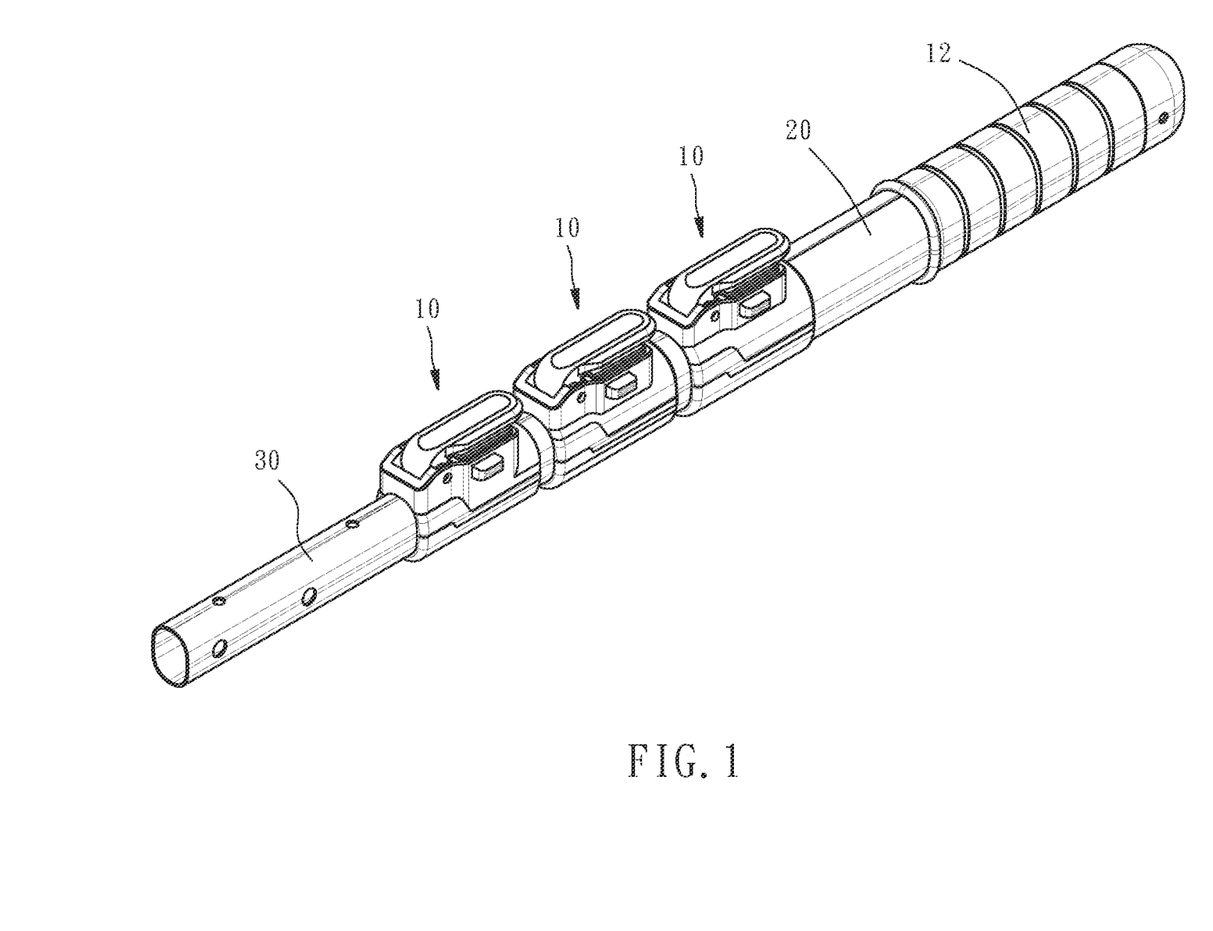
FIG. 1 is a perspective view of a plurality of telescopic tube assemblies of the present invention, in which the telescopic tube assemblies are connected in series and assembled with a grip.
Figure 2:
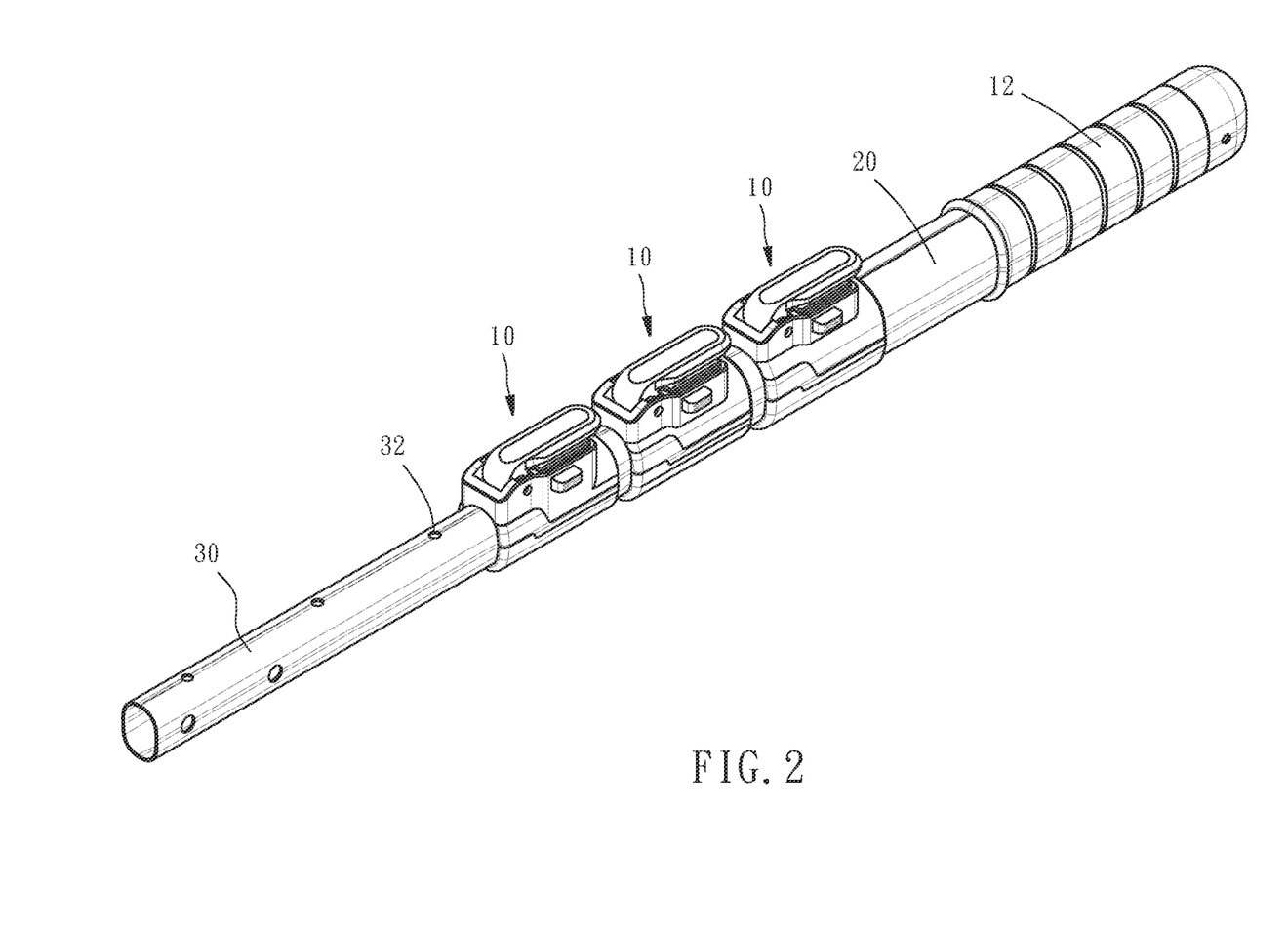
FIG. 2 is similar to FIG. 1, showing one of the second tubes is elongated.
Figure 3:
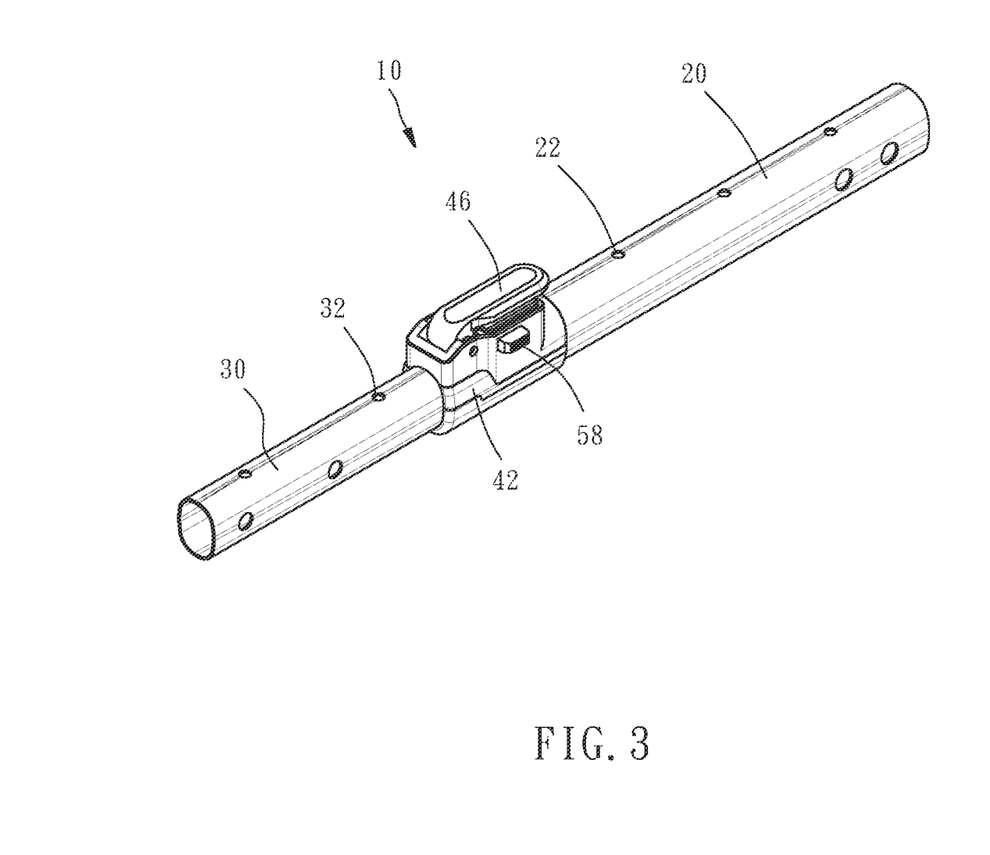
FIG. 3 is a perspective view of the telescopic tube assembly of the present invention.

Referring to FIGS. 1 and 2, the telescopic tube assembly 10 of the present invention is mainly used in (but not limited to) gardening tools (such as tree branch shears, loppers or pruning saws). In the configuration, several of the telescopic tube assemblies are connected in series to the required length. After the assembly is completed, the front end is assembled with cutting blades (not shown), and the rear end is assembled with a grip 12. The number of the telescopic tube assembly 10 can be increased or decreased according to actual needs. In FIG. 1, the telescopic tube assembly 10 is three in number, but not limited thereto.

Referring to FIGS. 3 to 6, the telescopic tube assembly 10 of the present invention comprises a first tube 20, a second tube 30, a first positioning unit 40, and a second positioning unit 50.

The first tube 20 has a plurality of first positioning holes 22 (the number is unlimited) arranged along the axial direction of the first tube 20.

The second tube 30 is partially penetrated into the first tube 20 and movable relative to the first tube 20 along the axial direction thereof. The second tube 30 has a plurality of second positioning holes 32 (the number is unlimited) arranged along the axial direction of the second tube 30.

The first positioning unit 40 includes a base 42 sleeved on a junction of the first tube 20 and the second tube 30 and fixed to the first tube 20 by using a screw 44. The front end of the base 42 has a first positioning portion 422 and two hollow slots 424 abutted with the first positioning portion 422. The middle of the base 42 has a through hole 426 and a lateral hole 428 located at one side of the through hole 426.

Figure 5:
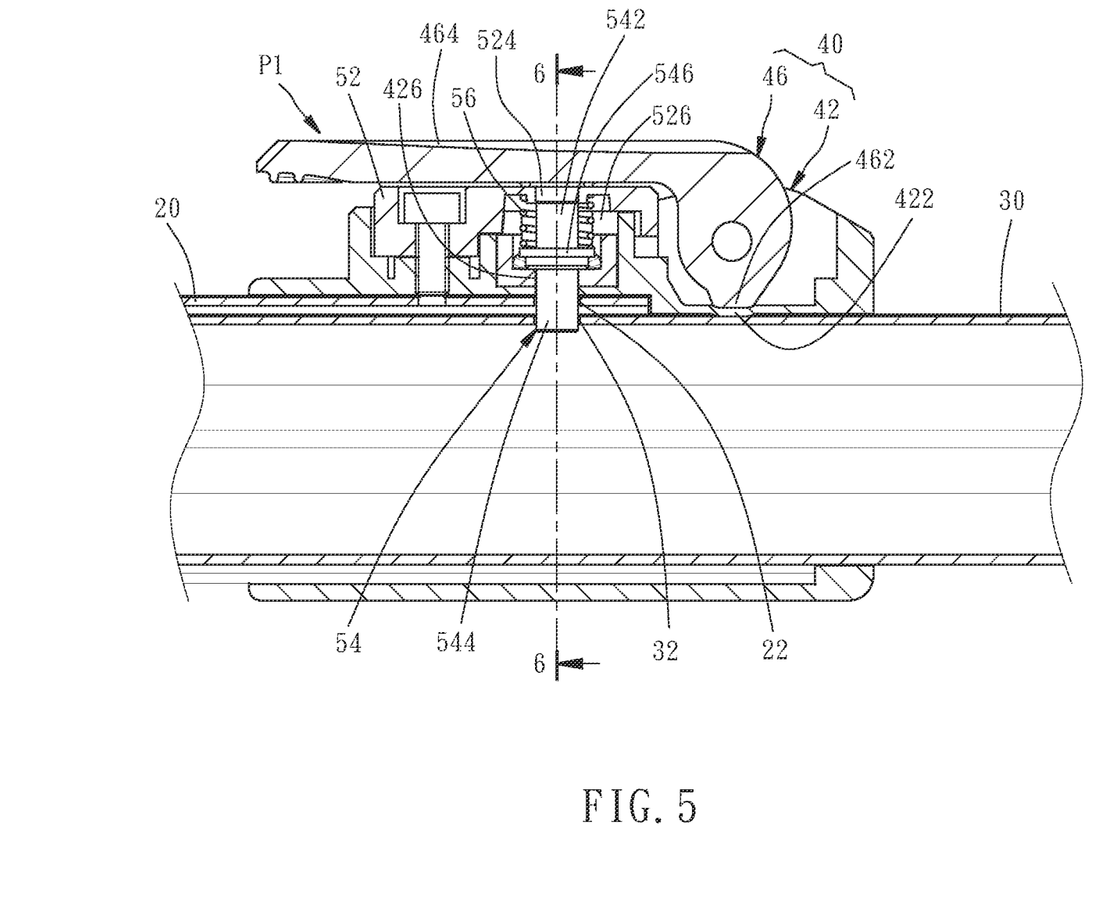
FIG. 5 is an axially sectional view of the telescopic tube assembly of the present invention, showing the handle is located at the lock position.
Figure 7:
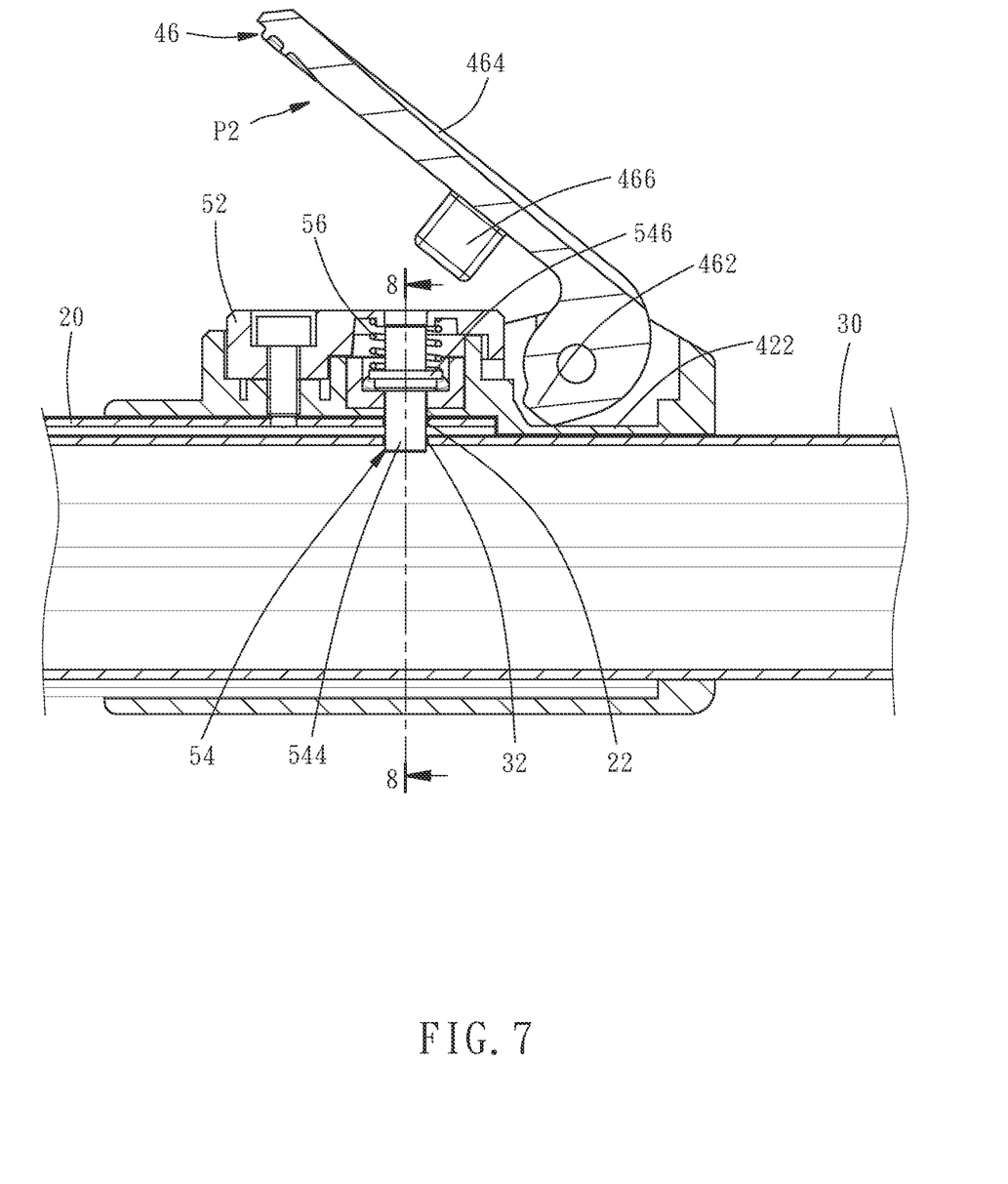
FIG. 7 is similar to FIG. 5, showing the handle is located at the unlock position.

The first positioning unit 40 further includes a handle 46 provided with a cam portion 462, a handle portion 464 connected with the cam portion 462, and a block portion 466 protruded from the bottom side of the handle portion 464. The cam portion 462 of the handle 46 is pivoted to the front end of the base 42 through a pivot 48, such that the handle 46 is pivotable relative to the base 42 between a lock position P1 (as shown in FIG. 5) and an unlock position P2 (as shown in FIG. 7). When the handle 46 is located at the lock position P1 (as shown in FIG. 5), the first positioning portion 422 of the base 42, which is abutted with the two hollow slots 424, is pushed by the cam portion 462 of the handle 46, such that the first positioning portion 422 of the base 42 is deformed elastically to be pressed against the outer surface of the second tube 30. When the handle 46 is located at the unlock position P2 (as shown in FIG. 7), the cam portion 462 of the handle 46 leaves the first positioning portion 422 of the base 42, such that the first positioning portion 422 of the base 42 is loosen from the outer surface of the second tube 30.

Figure 4:
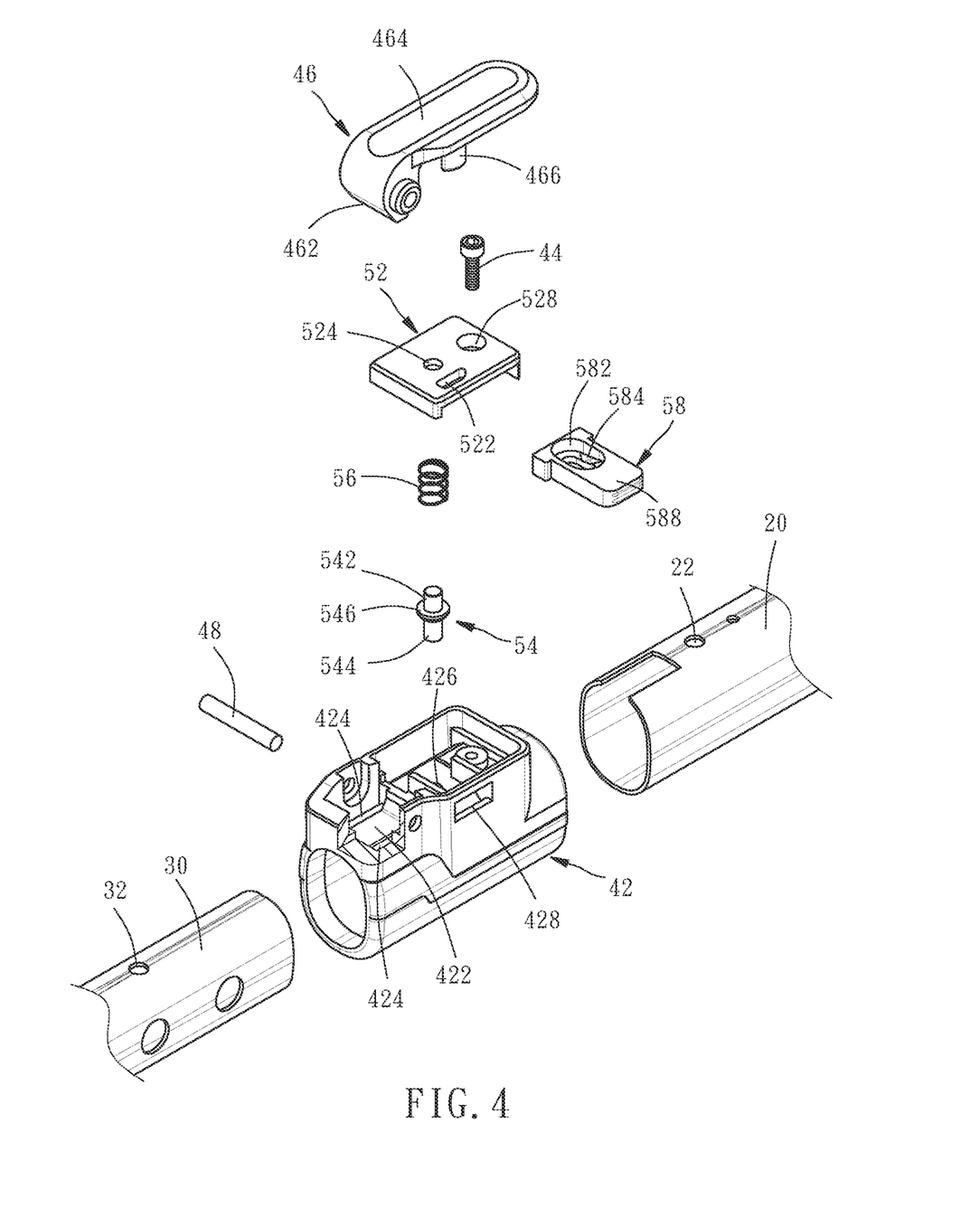
FIG. 4 is an exploded perspective view of the telescopic tube assembly of the present invention.
Figure 6:
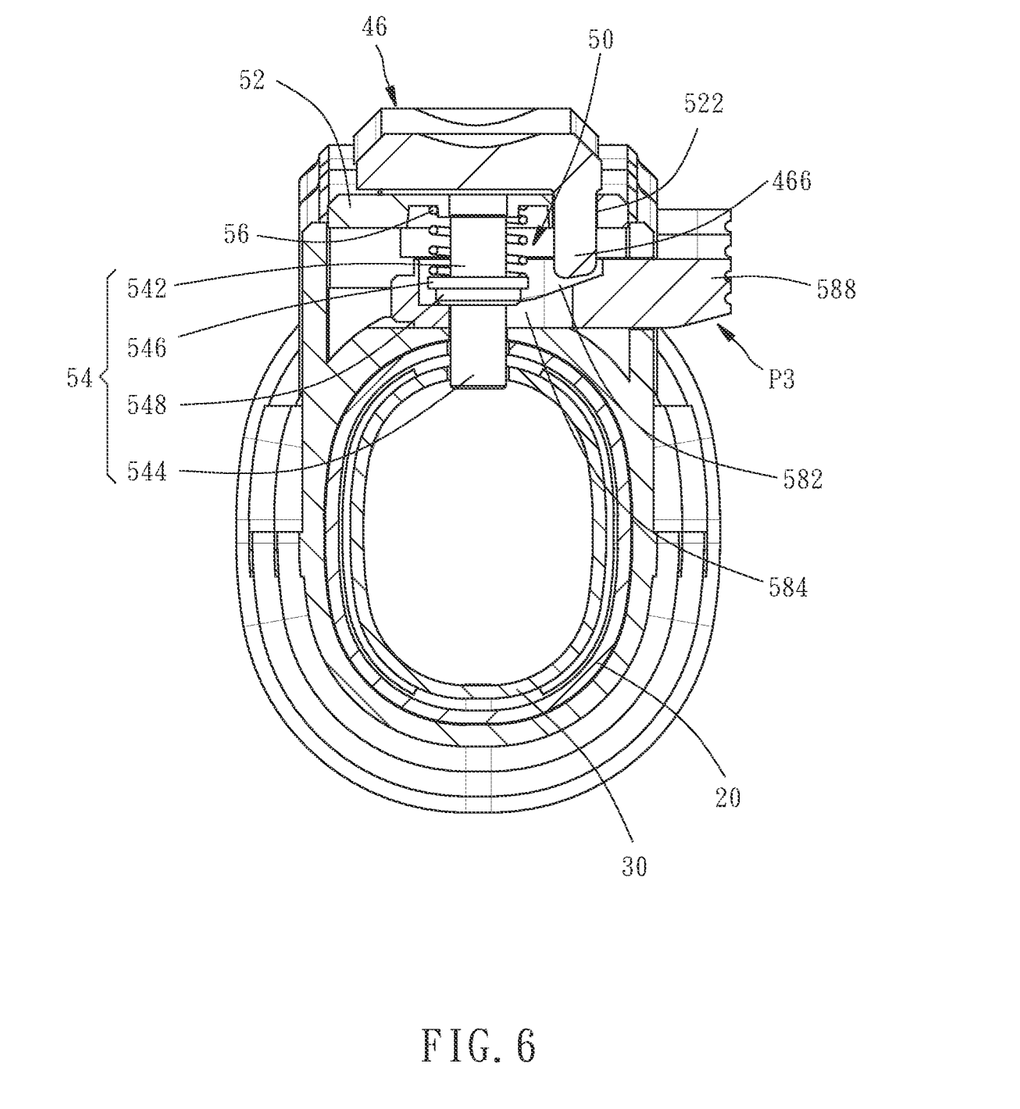
FIG. 6 is a sectional view taken along line 6-6 of FIG. 5.

As shown in FIGS. 4 to 6, the second positioning unit 50 includes a cover 52, a pin 54, an elastic member 56, and a button 58.

The cover 52 is disposed on a top opening of the base 42 and provided with a countersunk screw hole 528 for accommodation of the screw 44, such that the cover 52 is fastened to the base 42 through the screw 44. By this way, an accommodation space 526 communicating with the through hole 426 and the lateral hole 428 is defined between the cover 52 and the base 42. Further, the cover 52 has a first receiving hole 522 communicating with the accommodation space 526 and a second receiving hole 524 communicating with the accommodation space 526.

The pin 54 includes a head portion 542, a first outer flange 546 abutted with the head portion 542, a second outer flange 548 abutted with the first outer flange 546, and a second positioning portion 544. As shown in FIGS. 5 and 6, the pin 54 is disposed in the accommodation space 526 in such a way that the head portion 542 is received in the second receiving hole 524 of the cover 52, and the second positioning portion 544 is inserted into one of the first positioning holes 22 of the first tube 20 and the through hole 426 of the base 42.

The elastic member 56 is embodied as a compression spring. The elastic member 56 is sleeved on the head portion 542 of the pin 54 and provided with two ends thereof stopped against the cover 52 and the first outer flange 546 of the pin 54 respectively for providing an elastic force to push the pin 54 in a direction away from the cover 52.

The button 58 is inserted into the lateral hole 428 of the base 42 and moved horizontally relative to the base 42. One end of the button 58 has a pressed portion 588 protruding out of the base 42, and the other end of the button 58 has an elongated slot 582 and an inner flange 584 connected with the periphery wall of the elongated slot 582. The inner flange 584 has an inclined plane 586 at one end thereof close to the pressed portion 588. As shown in FIG. 6, the elongated slot 582 of the button 58 is penetrated by the second positioning portion 544 of the pin 54, and the inner flange 584 of the button 58 is engaged with the second outer flange 548 of the pin 54.

Figure 8:
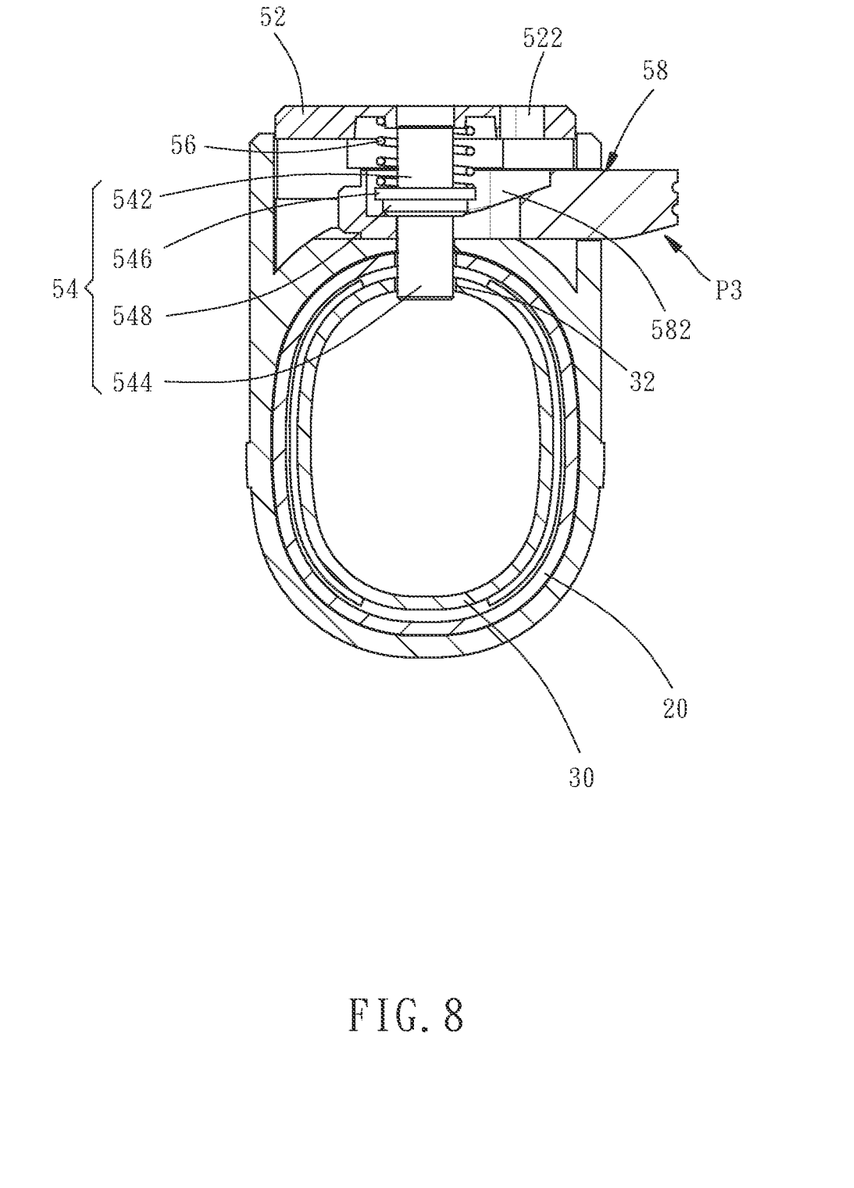
FIG. 8 is a sectional view taken along line 8-8 of FIG. 7, showing the button is located at the releasing position.
Figure 9:
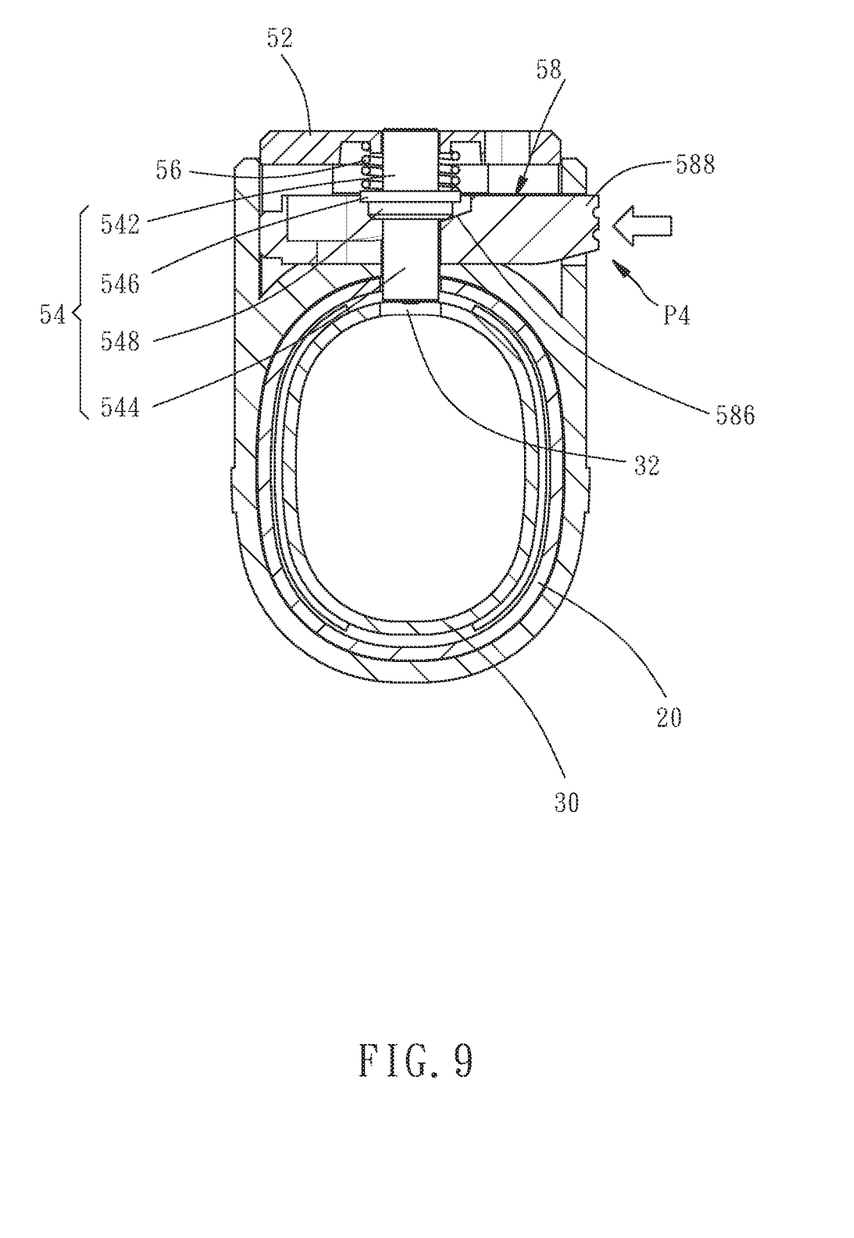
FIG. 9 is similar to FIG. 8, showing the button is located at the press position.

As such, when the button 58 isn't pressed by an external force to be located at a releasing position P3 as shown in FIG. 8, the first outer flange 546 of the pin 54 is pushed by the elastic member 56, such that the second positioning portion 544 of the pin 54 is inserted into one of the second positioning holes 32 of the second tube 30, thereby locking the second tube 30. When the pressed portion 588 of the button 58 is pressed by an external force, the button 58 is moved to a press position P4 as shown in FIG. 9. At this time, the inclined plane 586 of the button 58 pushes the second outer flange 548 of the pin 54 to move the pin 54 towards the cover 52. On one hand, the elastic member 56 is compressed by the first outer flange 546 of the pin 54, and on the other hand, the second positioning portion 544 of the pin 54 is separated from the second positioning holes 32 of the second tube 30, thereby unlocking the second tube 30. Further, when the handle 46 is located at the lock position P1 as shown in FIG. 5, the block portion 466 of the handle 46 is received in the first receiving hole 522 of the cover 52 and inserted into the elongated slot 582 of the button 58 (see FIG. 6), such that the handle 46 causes interference with the button 58, and therefore, the button 58 can't be pressed. When the handle 46 is located at the unlock position P2 as shown in FIG. 7, the block portion 466 of the handle 46 is separated from the first receiving hole 522 of the cover 52 and the elongated slot 582 of the button 58 (see FIG. 8), such that the handle 46 does not cause interference with the button 58. This causes that the button 58 can be pressed.

It can be seen from the above that when a user would like to adjust the length of the second tube 30, pulling the handle 46 to the unlock position P2 as shown in FIG. 7 and then pressing the button 58. As shown in FIG. 9, the pin 54 is pushed by the button 58 to unlock the second tube 30. At this time, the user can adjust the length of the second tube 30. After the second tube 30 reaches a desired length, the user releases the button 58. At this time, under the elastic force of the elastic member 56, the second outer flange 548 of the pin 54 pushes the inclined plane 586 of the button 58 to move the button 58 to the releasing position P3 as shown in FIG. 8, and the second positioning portion 544 of the pin 54 is inserted into one of the second positioning holes 32 of the second tube 30. Finally, the user presses the handle 46 to the lock position P1 as shown in FIG. 5 to enable the first positioning portion 422 of the base 42 to be pressed against the outer surface of the second tube 30, thereby locking the second tube 30.

As indicated above, by means of the dual pressing mechanism of the handle 46 and the pin 54, the second tube 30 has a good positioning effect to reduce the risk of operation. Further, the second tube 30 does not easily become loose by an external force, so several of the telescopic tube assemblies 10 of the present invention can be assembled into longer to meet the needs of long-distance use.

What is claimed is:

1. A telescopic tube assembly comprising:
   a first tube having a first positioning hole;
   a second tube movably disposed in the first tube and having a plurality of second positioning holes arranged in a spaced manner along an axial direction thereof;
   a first positioning unit including a base mounted to the first tube and having a first positioning portion and a through hole, and a handle having a handle portion and a cam portion connected with the handle portion and pivoted to the base, such that the handle is pivotable relative to the base between a lock position where the cam portion of the handle pushes the first positioning portion of the base for enabling the first positioning portion of the base to be pressed against an outer surface of the second tube, and an unlock position where the cam portion of the handle leaves the first positioning portion of the base for enabling the first positioning portion of the base to be loosen from the outer surface of the second tube; and
   a second positioning unit including a cover disposed on the base to define an accommodation space therebetween communicating with the through hole, a pin axially movably disposed in the accommodation space and having a second positioning portion passing through the through hole of the base and the first positioning hole of the first tube, an elastic member disposed between the cover and the pin and pushing the pin in a direction away from the cover, and a button horizontally movably disposed in the base so as to be moveable between a press position where the pin is pushed by the button towards the cover for enabling the second positioning portion of the pin to be unlocked from the second positioning holes of the second tube, and a releasing position where the pin is pushed by the elastic member away from the cover for enabling the second positioning portion of the pin to be locked to one of the second positioning holes of the second tube,
   wherein the pin further has a first outer flange and a second outer flange abutted with the first outer flange, the elastic member is disposed between the cover and the first outer flange of the pin, the button has an inclined plane pushing the second outer flange of the pin when the button is located at the press position and releasing the second outer flange of the pin when the button is located at the releasing position.

2. The telescopic tube assembly as claimed in claim 1, wherein the button further has an elongated slot and an inner flange connected with a periphery wall of the elongated slot and provided with the inclined plane; the pin is disposed in the elongated slot of the button in a way that the second outer flange of the pin is engaged with the inner flange of the button.

3. The telescopic tube assembly as claimed in claim 2, wherein the handle further has a block portion connected with the handle portion; when the handle is located at the lock position, the block portion of the handle is engaged with the elongated slot of the button to keep the button in the releasing position, and when the handle is located at the unlock position, the block portion of the handle is disengaged from the elongated slot of the button, such that the button can be moved from the releasing position to the press position.

4. The telescopic tube assembly as claimed in claim 1, wherein the base further has a hollow slot abutted with the first positioning portion.

\* \* \* \* \*